(12) United States Patent
Kapiloff et al.

(10) Patent No.: US 9,365,015 B1
(45) Date of Patent: Jun. 14, 2016

(54) SHATTER-RESISTANT, OPTICALLY-TRANSPARENT PANELS AND METHODS OF USE OF THE PANELS FOR ON-SITE RETROFITTING AND REINFORCING OF PASSAGEWAYS

(71) Applicants: Christopher Kapiloff, Williamstown, MA (US); Jeffrey Besse, Pittsfield, MA (US)

(72) Inventors: Christopher Kapiloff, Williamstown, MA (US); Jeffrey Besse, Pittsfield, MA (US)

( * ) Notice: Subject to any disclaimer, the term of this patent is extended or adjusted under 35 U.S.C. 154(b) by 0 days.

(21) Appl. No.: 14/710,048

(22) Filed: May 12, 2015

Related U.S. Application Data

(60) Provisional application No. 61/992,065, filed on May 12, 2014.

(51) Int. Cl.
*E06B 3/00* (2006.01)
*B32B 17/10* (2006.01)
*E06B 3/54* (2006.01)

(52) U.S. Cl.
CPC ....... *B32B 17/10036* (2013.01); *B32B 17/1077* (2013.01); *B32B 17/10752* (2013.01); *E06B 3/5427* (2013.01); *B32B 2607/00* (2013.01)

(58) Field of Classification Search
CPC .................... B32B 17/10036; B32B 17/1077; B32B 17/10752; B32B 2607/00; E06B 3/5427
USPC ............. 52/204.5, 204.591, 204.593, 204.67; 156/102
See application file for complete search history.

(56) References Cited

U.S. PATENT DOCUMENTS

| | | | |
|---|---|---|---|
| 2,733,789 A * | 2/1956 | Tolle ......................... | E06B 3/66 156/107 |
| 3,919,022 A * | 11/1975 | Stefanik ............ | B32B 17/10293 156/104 |
| 3,930,452 A * | 1/1976 | Van Laethem .... | B32B 17/10045 109/49.5 |
| 4,004,388 A * | 1/1977 | Stefanik ............ | B32B 17/10293 244/121 |
| 4,149,348 A * | 4/1979 | Pyzewski ............ | E06B 3/66366 156/109 |
| 4,481,887 A | 11/1984 | Urbano | |
| 4,824,722 A | 4/1989 | Jarrett | |
| 4,933,227 A * | 6/1990 | Stewart ............. | B32B 17/10018 156/102 |
| 5,636,579 A | 6/1997 | Shelley | |
| 5,834,124 A | 11/1998 | Pease, III et al. | |
| 6,182,406 B1 | 2/2001 | Hunt | |
| 6,199,331 B1 | 3/2001 | Hunt | |
| 6,609,350 B1 | 8/2003 | Webber | |
| 6,630,235 B2 | 10/2003 | Oshima et al. | |
| 6,808,797 B1 | 10/2004 | Bordeaux | |
| 7,334,371 B2 * | 2/2008 | Rinehart ........... | B32B 17/10036 52/204.593 |
| 7,641,965 B1 | 1/2010 | Bennison et al. | |
| 7,681,369 B2 * | 3/2010 | Soltesiz ................ | E06B 3/6604 52/204.593 |
| 7,691,470 B2 | 4/2010 | Goodson et al. | |
| 7,797,882 B2 | 9/2010 | Lubaway | |
| 7,867,605 B2 | 1/2011 | Moran et al. | |
| 7,919,175 B2 | 4/2011 | Bennison et al. | |
| 8,399,097 B2 | 3/2013 | Bennison et al. | |
| 2009/0217813 A1 * | 9/2009 | Carberry ........... | B32B 17/10036 89/36.02 |

* cited by examiner

*Primary Examiner* — Basil Katcheves
(74) *Attorney, Agent, or Firm* — Malcolm J. Chisholm, Jr.

(57) ABSTRACT

The disclosure includes multi-layered panels (10) including exterior layers of glass (12, 44) and interior layers of urethane (20, 36) and at least one layer of polycarbonate (16) between the urethane layers (20, 36) that result in enhanced shatter resistance within panels that weigh between about 4.1 and 4.6 pounds per square foot. An insertion tab (23) of the polycarbonate layer (16) enhances performance of the panel (10). A method of on-site retrofitting and reinforcing of existing passageway (70) frames (72) without removal of the frames (72) from a building provides for low-cost, highly efficient improvement of intrusion resistance of passageways (70) such as doors and windows of schools, hospitals and other public and private buildings.

4 Claims, 4 Drawing Sheets

SHATTER-RESISTANT, OPTICALLY-TRANSPARENT PANELS AND METHODS OF USE OF THE PANELS FOR ON-SITE RETROFITTING AND REINFORCING OF PASSAGEWAYS

CROSS-REFERENCE TO RELATED APPLICATIONS

This Application claims the benefit of U.S. Provisional Patent Application Ser. No. 61/992,065 that was filed on 12 May 2014 entitled "Shatter-Resistant, Optically-Transparent Panels and Methods of Use of the Panels for On-site Retrofitting and Reinforcing of Passageways".

TECHNICAL FIELD

This disclosure relates to shatter-resistant, optically-transparent panels for use in glass passageways, such as doors or windows, to enhance security of the doors and/or windows. The disclosure also relates to a method of on-site retrofitting of the shatter-resistant, optically-transparent panels into existing door frames while simultaneously reinforcing the door frames.

BACKGROUND ART

It is well known that doorways to public buildings, such as schools, courthouses, etc., present security challenges in preventing unwanted persons from entering through the doors. In a tragic example of a security failure of a common school door, on Dec. 14, 2012, an armed intruder shattered a front door of the Sandy Hook Elementary School in Newtown, Conn., U.S.A. and proceeded to shoot and kill 26 unarmed civilians. The front door of the Sandy Hook Elementary School was only tempered glass that shattered and collapsed upon impact with one bullet fired by the intruder from a gun so that the intruder could then walk through the door into the school.

Many efforts have been made to improve intrusion resistance of glass doors of public and private buildings. For buildings housing high-value persons and or museum-type goods, it is well known to use thick, bullet-proof types of layered glass. For example, U.S. Pat. No. 7,641,965 that issued on Jan. 5, 2010 to Bennison et al. and that is owned by E.I. du Pond de Nemours and Company, shows a multi-layered optically transparent, ballistic resistant "safety glazing" or window. The Bennison et al. "safety glazing" has an impact zone at one surface, such as an exterior surface of a window of an armored vehicle, and an anti-spall surface to prevent fragments of the window from breaking off and impacting persons within the armored vehicle. In one embodiment, Bennison et al. shows windows having between five and eleven layers. While effective, such a complex window is both prohibitively expensive and too heavy to be utilized in common doorways of public buildings, such as public schools, courthouses, university buildings, hospitals, etc.

More recently, U.S. Pat. No. 7,867,605 that issued on Jan. 11, 2011 to Moran et al. shows an intrusion resistant glass laminate for use between two layers of glass to provide enhanced stiffness without loss of optical clarity. Moran et al. discloses stiffness factors that result in resistance to increasing numbers of axe-head impacts, 19.5 Kg. pendulum impacts, blunt head impacts (for car windshields) and other intrusion risks. Again, while such thick, stiff safety glazed, transparent panels provide protection, they generally weigh in excess of 20 pounds per square feet, and hence cannot be efficiently utilized in existing doorways of public buildings.

Consequently, there is a need for a light-weight, shatter-resistant, transparent panel that can be efficiently retrofitted into existing doorways at a minimum cost while providing substantially enhanced resistance to shattering to thereby provide a secure doorway.

SUMMARY OF THE DISCLOSURE

The disclosure is a shatter-resistant, optically-transparent panel for resisting breaking of the panel into pieces. The disclosure includes two embodiments of the panel; a first thin embodiment, and a second thick embodiment. The disclosure also includes a method of using either the thin or thick embodiment to perform an on-site retrofitting and reinforcing of a traditional passageway such as a door or a window secured within a building, such as a school, hospital, etc.

The thin embodiment includes a first layer being a first glass sheet having an exterior surface and an opposed interior surface, the first glass sheet having a thickness of about 3.048 millimeters [0.12"]; a second layer being a first urethane sheet having an upper surface secured adjacent the interior surface of the first glass sheet and having a lower surface, the first urethane sheet having a thickness of about 0.635 millimeters [0.025]; a third layer being a polycarbonate sheet having an upper surface secured adjacent the lower surface of the first urethane sheet and having a lower surface, the polycarbonate sheet having a thickness of about 2.997 millimeters [0.118"]; a fourth layer being a second urethane sheet having an upper surface secured adjacent the lower surface of the polycarbonate sheet and having a lower surface, the second urethane sheet having a thickness of about 0.635 millimeters [0.025"]; and, a fifth layer being a second glass sheet having an interior surface secured adjacent the lower surface of the second urethane sheet and having an exterior surface, the second glass sheet having a thickness of about 3.048 millimeters [0.120"]. The total thickness of the thin embodiment is about 10.363 millimeters ("mm") [0.408"].

The thick embodiment is similar to the thin embodiment but has seven total layers having an additional urethane coated polycarbonate sheet. The seven layers include a first layer being a first glass sheet having an exterior surface and an opposed interior surface, the first glass sheet having a thickness of about 3.048 millimeters [0.12"]; a second layer being a first urethane sheet having an upper surface secured adjacent the interior surface of the first glass sheet and having a lower surface, the first urethane sheet having a thickness of about 1.270 millimeters [0.050"]; a third layer being a first polycarbonate sheet having an upper surface secured adjacent the lower surface of the first urethane sheet and having a lower surface, the first polycarbonate sheet having a thickness of about 2.997 millimeters [0.118"]; a fourth layer being a second urethane sheet having an upper surface secured adjacent the lower surface of the first polycarbonate sheet and having a lower surface, the second urethane sheet having a thickness of about 0.381 millimeters [0.015"]; a fifth layer being a second polycarbonate sheet having an upper surface secured adjacent the lower surface of the second urethane sheet and having a lower surface, the second polycarbonate sheet having a thickness of about 0.762 millimeters [0.030"]; a sixth layer being a third urethane sheet having an upper surface secured adjacent the lower surface of the second polycarbonate sheet and having a lower surface, the third urethane sheet having a thickness of about 1.270 millimeters [0.050"]; and, a seventh layer being a second glass sheet having an interior surface secured adjacent the lower surface of the third urethane sheet and having an exterior surface, the second glass sheet having a thickness of about 3.048 millimeters [0.120"]. The total thickness of the thick embodiment is about 11.760 millimeters [0.463"].

For purposes herein, the word "about" is to mean plus or minus twenty-percent. Additionally, the word "thickness" is to mean a shortest distance between opposed surfaces or the described object.

Both the thin and thick embodiments of the panel may be configured so each of the five or seven layers are disposed to overlie adjacent layers and each of the five or seven layers are configured to be co-extensive with each other so that each layer has a perimeter edge overlying a perimeter edge of an adjacent layer.

Additionally, both the thin and thick embodiments of the panels may include the polycarbonate sheet of the thin embodiment, or the first polycarbonate sheet of the thick embodiment, overlying adjacent sheets and having at least a portion or all of perimeter edges of the polycarbonate sheets define an insertion tab extending beyond the perimeter edges of the other sheets of the panels.

The disclosure includes a method of on-site retrofitting and reinforcing a passageway with a shatter-resistant, optically transparent panel. The method includes removing exterior stops surrounding an exterior surface of the passageway between a passageway frame and glass to be replaced; then, removing the glass to be replaced. Weather stripping is then taken off of the removed exterior stops and from the interior stops that remain surrounding the passageway frame. To reinforce the existing passageway frame and the exterior and interior stops, the interior stops are first drilled and metal screws are counter sunk into the interior stops and the metal screws pass through the interior stops and into the passageway frame at least 13 mm [about 0.5 inches] and every 304 mm [12 inches] on-center starting at a center of each stop. A minimum of three screws are required for each stop unless the stop is less than 304 mm [12 inches] in length. The metal screws are flat headed screws, and are not smaller than a size 8 screw. (For purposes herein, a "size 8 screw" is to mean that a diameter of the threaded shaft of the screw is about 4.1656 mm [0.1640 inches].) After the interior stops are thereby reinforced, the exterior stops are reinserted into the passageway frame, and then reinforced in the same manner as the interior stops as described above. The reinforcing screws of the exterior stops are positioned so that the screws in the exterior stops are aligned with the screws in the interior stops.

After reinforcing the stops, the exterior stops are removed, and then a 3.048 mm [0.120 (⅛) inch] bead of a blast proof caulking is applied at a base of the interior stop and the passageway frame surrounding an entire perimeter of the passageway frame. The blast proof caulking may be caulking known as "Dow Corning 995 Structural Glazing Bomb Blast Silicone Sealant" that is commonly available. Then, the method includes installing either the thin or thick embodiment of the shatter-resistant, optically-transparent panel into the passageway frame adjacent the bead of caulking.

Next, a 3.048 mm [0.120 (⅛) inch] bead of the blast proof caulking is applied along an entire exterior perimeter of the selected panel where the panel meets the passageway frame. The exterior stops are then installed so that holes drilled in the stops align with holes drilled in the passageway frame. Finally, a bead that is less than 3.048 mm [0.120 (⅛) inch] of the blast proof caulking is applied within a gap between the exterior surface of the selected panel and the exterior stops, and is also applied within a gap between the interior surface of the selected panel and the interior stops.

Testing by the inventors has established an enormous increase in shatter-resistance of the described panels that provides dramatically enhanced security for persons within an interior of a building protected by the passageways, such as doors and windows, retrofitted with the thin or thick embodiments of the present disclosure. Prior efforts to obtain anywhere near the same level of intrusion resistance necessarily included complete removal of the passageway frame and replacement with a frame that can support bullet-proof or intrusion resistant glass weighing typically more than 25 pounds per square foot, which is a very costly and time-consuming undertaking. In contrast, the panels of the present thin and thick embodiments weigh between about 4.1 pounds and 4.6 pounds per square foot, and hence can be easily supported by standard door passageway frames configured to support one-quarter inch, standard tempered glass panels commonly utilized in public school buildings.

Again, the present invention, especially the embodiments of the thin and thick panels that include the extending polycarbonate layers having the extending insertion tabs, have been successfully tested to withstand extraordinary intrusion efforts. In one test, more than five bullets from a Hungarian made "AK-47" rifle firing 7.62 mm rounds defined a semi-circle of penetration through a thick embodiment of the panel within a standard school door frame. The semi-circle of holes was around a lock access and positioned in an effort to permit the shooter to knock out or shatter a section of the panel around a hand actuated interior lock of the door. The panel did not fail. Then, a two-hundred pounds plus male swung a baseball bat at the semi-circle as hard as he could for over fifty strikes. The panel did not fail. Instead, the door frame failed, leading the inventors herein to develop the above-described passageway frame reinforcing system integrated with the on-site retrofitting system.

The inventors have concluded that their present disclosure presents extraordinary benefits in efficiently and quickly enhancing the security of public schools especially, and other public and private buildings. In light of the tragedy of the Newtown Conn. massacre described above, the present disclosure provides an immeasurable value for the security of children and others faced with the terror of unrestrained violence.

Accordingly, it is a primary purpose of the present disclosure to provide a shatter-proof, optically resistant panel for resisting breaking of the panel into pieces and an efficient, inexpensive method of using the panels for on-site retrofitting and reinforcing of passageways with the panels. These and other advantages purposes of the present disclosure will become apparent when the following description is read along with the accompanying drawings.

3, and showing a frame of the door passageway reinforced by insertion of a shatter-resistant, optically-transparent panel constructed in accordance with the present disclosure.

PREFERRED EMBODIMENTS OF THE DISCLOSURE

Figure 1:
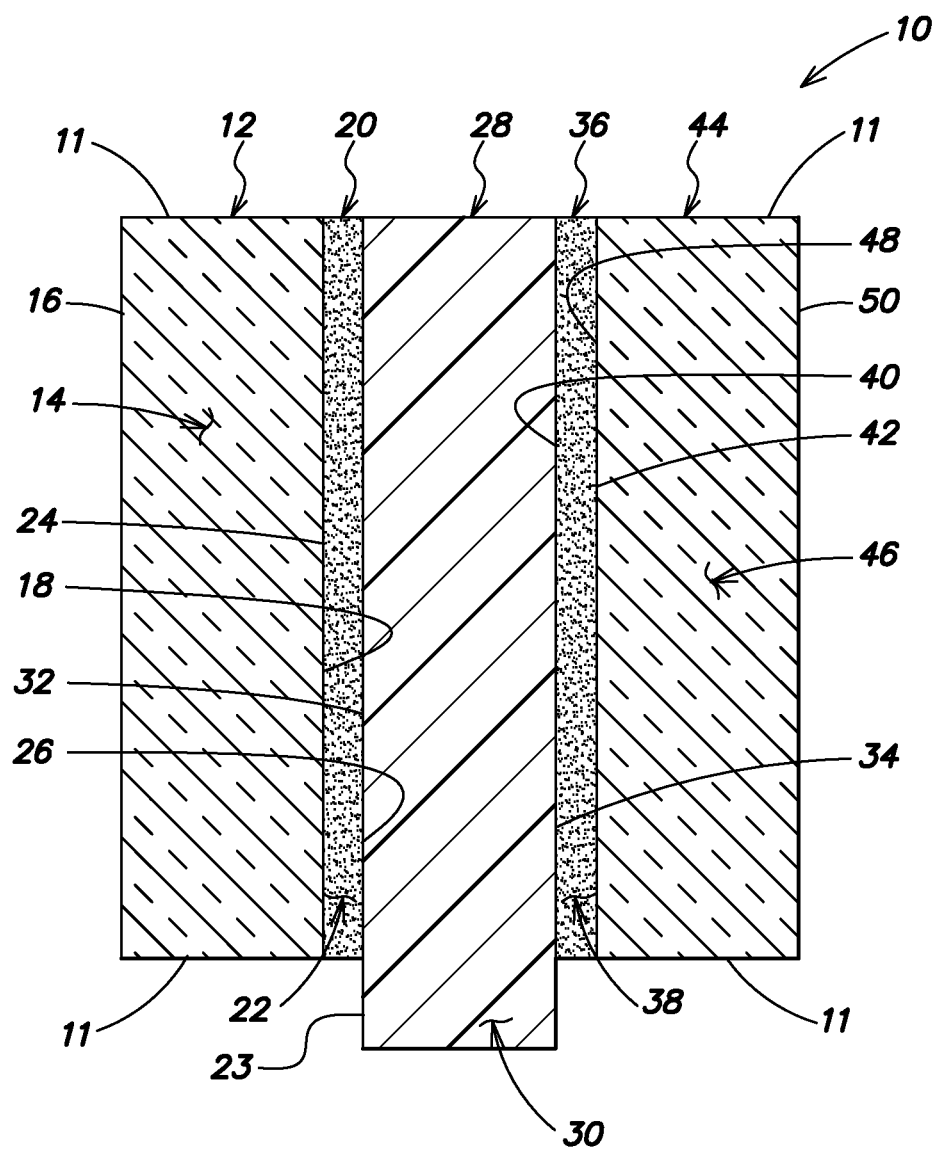
FIG. 1 is a cross-sectional, fragmentary, schematic view of a thin embodiment of a shatter-resistant, optically-transparent panel constructed in accordance with the present disclosure.

Referring to the drawings in detail, a thin panel embodiment of a shatter-resistant, optically-transparent panel is shown in a cross-sectional, fragmentary and simplified view in FIG. 1 and is generally designated by the reference numeral 10. The thin panel embodiment 10 includes first layer 12 that includes a first glass sheet 14 having an exterior surface 16 and an opposed interior surface 13. The first glass sheet 14 has a thickness of about 3.048 millimeters [0.12"]. The thin embodiment 10 also includes second layer 20 made of a first urethane sheet 22 that has an upper surface 24 that is secured adjacent the interior surface 18 of the first glass sheet 14. The first urethane sheet 22 also has a lower surface 26 opposed to the upper surface 24. The first urethane sheet 22 has a thickness of about 0.635 millimeters [0.025]. A third layer 26 is made of a polycarbonate sheet 30 that has an upper surface 32 secured adjacent the lower surface 26 of the first urethane sheet 22. The polycarbonate sheet 30 also has a lower surface 34, and the polycarbonate sheet 30 has a thickness of about 2.997 millimeters [0.118"].

The thin panel embodiment 10 also has a fourth layer 36 made of a second urethane sheet 38 having an upper surface 40 secured adjacent the lower surface 34 of the polycarbonate sheet 30, and also having a lower surface 42. The second urethane sheet 38 has a thickness of about 0.635 millimeters [0.025"]. The thin embodiment 10 also has a fifth outer layer 44 made of a second glass sheet 46 which has an interior surface 48 secured adjacent the lower surface 42 of the second urethane sheet 38. The second glass sheet 46 also has an exterior surface 50, and the thickness of the second glass sheet 46 is about 3.048 millimeters [0.120"].

As recited above, for purposes herein, the word "about" is to mean plus or minus twenty-percent. Additionally, the word "thickness" is to mean a shortest distance between opposed surfaces or the described object.

It is to be understood that the word "urethane" as used herein to identify the two urethane sheets 22, 38 includes "polyurethane" and other polymers composed of a chain of organic units joined by carbamate (urethane) links. The purpose of the urethane layers 22, 38 in the present invention is to facilitate bonding of the extremely hard polycarbonate sheet 30 to the exterior glass layers 14, 46, and to provide elasticity that prevents cracking of any of the hard layers of the thin panel 10 when exposed to thermal stresses. Any other compound known to achieve that goal and that is known in the intrusion-resistant, bullet-proof panel arts may be used with or instead of the urethane layers and be within the scope of the present disclosure. Similarly, the word "polycarbonate" is to mean any polymer containing carbonate groups (—O—(C=O)—O—). An exemplary polycarbonate is sold under the trademark "LEXAN" and is commonly available from a SABIC Innovative Plastics company (formerly General Electric Plastics), of Pittsfield, Mass., United States of America.

Figure 2:
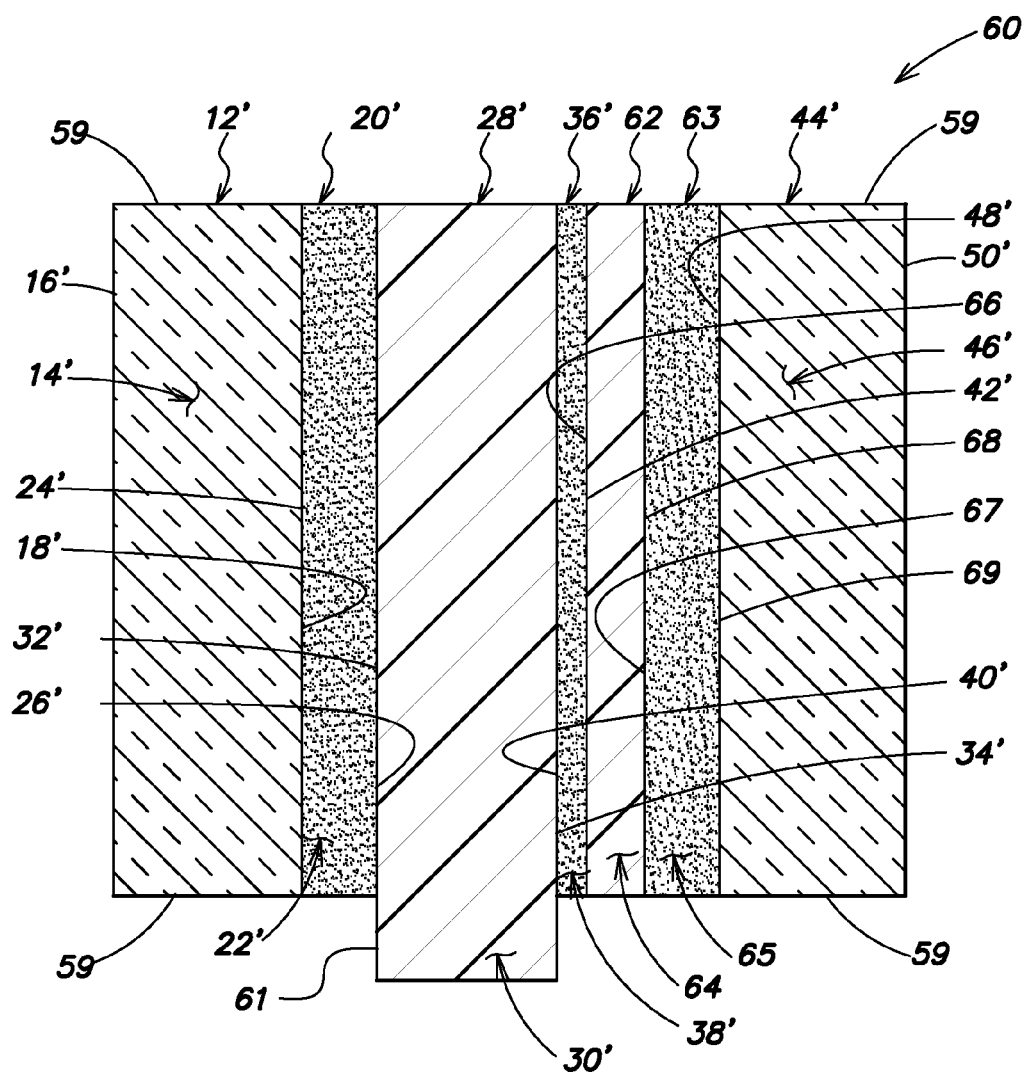
FIG. 2 is a cross-sectional, fragmentary, schematic view of a thick embodiment of a shatter-resistant, optically-transparent panel constructed in accordance with the present disclosure.

FIG. 2 shows a schematic, fragmentary embodiment of a thick panel embodiment 60 of the present shatter-proof, optically-transparent panel and is generally designated by the reference numeral 60. The thick panel embodiment 60 includes five layers that are very similar to the five layers of the above-described thin panel embodiment, and also includes two additional layers. For purposes of efficiency and ease of explanation, the layers of the thick panel embodiment 60 that are very similar to the layers described above for the thin panel embodiment 10 will be associated with primes of the reference numerals for the FIG. 1, thin panel embodiment 10. For example, the first layer of the thin panel embodiment 10 is associated with the reference numeral 12, and the first layer of the thick panel embodiment 60 will be associated with the reference numeral 12'.

The thick embodiment 60 includes a first layer 12' made of a first glass sheet 14', and it has an exterior surface 16' and an opposed interior surface 18'. The first glass sheet 14' has a thickness of about 3.048 millimeters [0.12"]. The thick panel embodiment 60 also includes a second layer 20' made of a first, urethane sheet 22' that has an upper surface 24' secured adjacent the interior surface 18' of the first glass sheet 14'. The first urethane sheet 22' also has a lower surface 26', and the first urethane sheet 22' of the thick panel embodiment has a thickness of about 1.270 millimeters [0.050"]. The thick panel embodiment 60 also includes a third layer 28' made of a first polycarbonate sheet 30' that has an upper surface 32' secured adjacent the lower surface 26' of the first urethane sheet 22' and has a lower surface 34'. The first polycarbonate sheet 30' of the thick panel 60 has a thickness of about 2.997 millimeters [0.118"]. A fourth layer 36' is made of a second urethane sheet 38', and it has an upper surface 40' that is secured adjacent the lower surface 34' of the first polycarbonate sheet 30', and it also a lower surface 42'. The second urethane sheet 38' of the thick panel 60 has a thickness of about 0.381 millimeters [0.015"].

The thick panel embodiment 60 includes a different fifth layer than the thin panel embodiment 10, and hence will not be represented by prime reference numerals and will be referred to as a fifth non-outer layer 62. The fifth non-outer layer is made of a second polycarbonate sheet 64 having an upper surface 66 secured adjacent the lower surface 42' of the second urethane sheet 38' and having a lower surface 68. The second polycarbonate sheet 64 has a thickness of about 0.762 millimeters [0.030"]. The thick panel 60 also has a sixth layer 63 that is made of a third urethane sheet 65 having an upper surface 67 secured adjacent the lower surface 68 of the second polycarbonate sheet 64. The third urethane sheet 65 also has a lower surface 69, and the third urethane sheet has a thickness of about 1.270 millimeters [0.050"]. The thick panel embodiment 60 also has an outer seventh layer which very similar to the fifth outer layer 44 of the thin embodiment 10. Therefore, components of the seventh outer layer of the thick embodiment 60 will be associated prime reference numerals of the fifth outer layer 44 of the thin embodiment 10. The seventh outer layer 44' is made of a second glass sheet 46' having an interior surface 48' secured adjacent the lower surface 69 of the third urethane sheet 65 and having an exterior surface 50', the second glass sheet having a thickness of about 3.048 millimeters [0.120"].

FIG. 1 also shows that the thin panel embodiment 10 defines a common perimeter edge 11 which is a farthest planer extension of all of the five layers 12, 20, 28, 36, 44 making up the thin panel embodiment 10. The five layers making up the thin panel 10 all share the common perimeter edge 11 so that all five layers overlie each other to define the common perimeter edge 11. However, a portion of the third layer 28 made of the first polycarbonate sheet 30 may define an insertion tab 23 that extends beyond the common perimeter edge 11. The insertion tab 23 may be one tab 23 that extends coextensively with the entire perimeter edge 11 of the panel 10, or the insertion tab 23 may be one of many insertion tabs 23 defined at predetermined locations along the perimeter edge 11 to help secure the panel 10 within a place of use of the panel 10, such as shown in FIG. 3.

Similarly, the FIG. 2 shows that the thick panel embodiment 60 defines a perimeter edge 59 which is a farthest planer extension of all of the seven layers 12', 20', 28', 36', 62, 63, 44' making up the thick panel embodiment 60. The seven layers making up the thick panel embodiment 60 all share the common perimeter edge 59 so that all seven layers overlie each other to define the common perimeter edge 59. However, a portion of the third layer 28' made of the first polycarbonate sheet 30' may define a second insertion tab 61 that extends beyond the common perimeter edge 59. The second insertion tab 61 may be one tab 61 that extends coextensively with the entire perimeter edge 59 of the panel 60, or the second insertion tab 61 may be one of many second insertion tabs 61 defined at predetermined locations along the perimeter edge 59 to help secure the panel 60 within a place of use of the panel 60 (shown in subsequent FIGS.).

Figure 3:
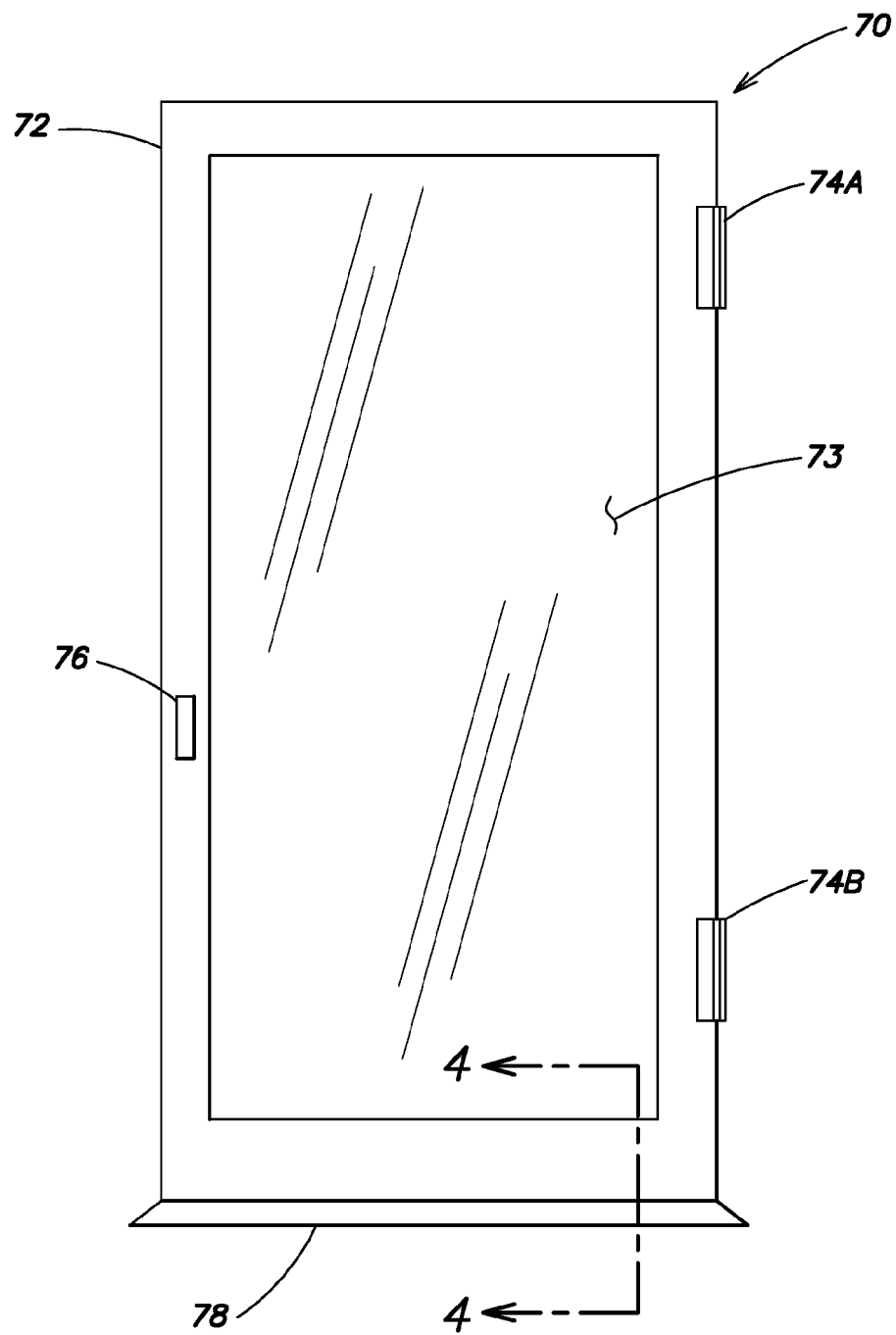
FIG. 3 is simplified front plan view of a door passageway within which a shatter-resistant, optically-transparent panel constructed in accordance with the present disclosure may be secured.

FIG. 3 is a simplified front plan view of a door passageway 70. The passageway includes a surrounding frame 72 for securing and supporting a shatter-resistant, optically-transparent panel 73 constructed in accordance with the present disclosure. The door passageway 70 may also include standard hinges 74A, 74B for hinging the door 70 into a building opening (not shown), and a standard door latch 76 for opening the door 70. Additionally, FIG. 3 shows the door passageway upon a standard sill 78 below the door 70.

Figure 4:
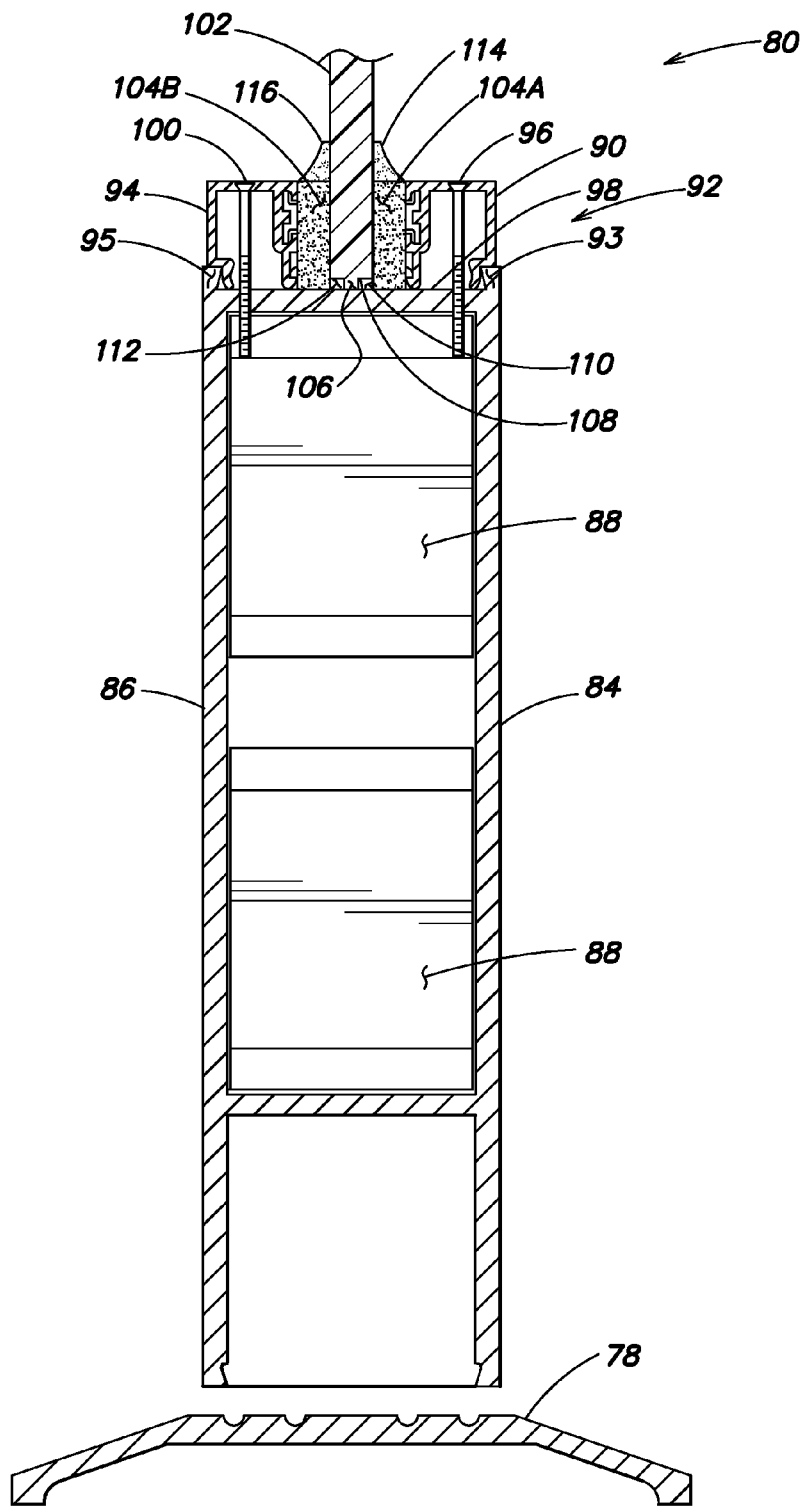
FIG. 4 is a fragmentary, cross-sectional view of a portion of the FIG. 3 door passageway taken along view line 4-4 of FIG.

FIG. 4 is a fragmentary, cross-sectional view of a portion of the FIG. 3 door passageway 70 taken along view line 4-4 of FIG. 3. FIG. 4 shows a lower section 80 of the door passageway 70 of FIG. 3. The lower section 80 is positioned above the sill 78 within a passageway over which a person would walk to pass through the passageway 70. The lower section 80 includes an interior structural surface 84 and an opposed exterior structural surface 86 having ordinary metal door structural support components 88 between the structural surfaces 84, 86. An interior stop 90 is shown secured within a door-frame compression receiver 92. The door-frame compression receiver 92 includes an interior grab-clip 93, and an opposed exterior grab-clip 95 at opposed outer edges of a top surface 98 of the compression receiver 92. The top surface 98 serves both a base 98 of the compression receiver 92 as well as a top structural surface 98 of the lower section 80 of the frame 72 of the door. An exterior stop 94 is shown at the opposed exterior surface 86, and is secured against the exterior grab-clip 95 of the compression receiver 92.

The interior stop 90 is shown having a reinforcing "No. 8 Metal Screw" 96 passing through the stop 90 and passing through the top surface 98 of the door-frame compression receiver 92, wherein the top surface 98 extends between top edges of the interior surface 84 and the exterior surface 86. The phrase "No. 8 Metal Screw" is an exemplary fastener. However, any metal screw or fastener is acceptable if it is about at least as wide as a No. 8 screw and that will pass completely through the interior and exterior stops 90, 94 and through the top surface 98 of the door-frame compression receiver 92 a distance about as long as 25% of a vertical length of the interior and exterior stops 90, 94 and that is also parallel to the interior and exterior surfaces 84, 86. FIG. 4 shows that the exterior stop 94 also has a second reinforcing metal screw 100 passing through the stop interior 90 and into and through the top surface 98 of the door-frame compression receiver 92.

FIG. 4 also shows a section of a thin panel embodiment 102 of the present shatter-proof, optically-transparent panel 102 which is constructed as described above for the FIG. 1 thin panel embodiment 10. The FIG. 4 thin panel embodiment 202 is secured between the interior stop 90 and the exterior stop 94, and with a beads 104A, 104B of blast proof caulking secured between opposed sides of the panel 102 and the interior stop 90 and exterior stop 94. (As described above, the blast proof caulking may be caulking known as "Dow Corning 995 Structural Glazing Bomb Blast Silicone Sealant" that is commonly available. FIG. 4 also shows an insertion tab 106 of a polycarbonate layer (shown in FIG. 1 at ref. no. 30) extending below a perimeter edge 108 the panel 102 to contact the upper surface 98 of the door-frame compression receiver 92. Because the insertion tab 106 extends below the perimeter edge 108 of the panel 102, an interior pivot void 110 and an exterior pivot void 112 are defined on opposed sides of the insertion cab 106, between the upper surface 98 of the door-frame compression receiver 92 and the perimeter edge 108 of the panel 102. The pivot voids 110, 112 substantially enhance the resistance of the panel 102 to shattering upon an impact against either of the opposed exterior surfaces (shown in FIG. 1 at ref. nos. 16 and 50) because the insertion tab 106 may pivot into the pivot voids 110, 112 instead of being firmly clamped, with no room for movement in response to the impact. Repeated experiments demonstrated that the panel 102 exhibits much greater shatter resistance through use of the insertion tab 106 compared to a panel (not shown) without the insertion tab 106, and this is most likely due to the pivot voids 110, 112. Additionally, the insertion tab 106 greatly enhances a bond between the panel 102, the interior and exterior stops 90, 94 and the upper surface 98 of the door-frame compression receiver 92. This disclosure includes a passageway 70 having the above described insertion tab 106 of the panel 10, 60 and the adjacent pivot voids 110, 112.

The present disclosure also includes a method of on-site retrofitting and reinforcing a passageway with a shatter-resistant, optically transparent panel. By retro-fitting "on-site", the method does not require removal of the passageway, such as the FIG. 3 door passageway 70, from the location wherein the door 70 is being used. This is an enormous cost-savings. Otherwise, a temporary door (not shown) would have to be replace the door 70 for off-site reinforcement.

The method includes the steps of first removing the exterior stops 94 surrounding an exterior surface 86 of the door 70. The exterior 94 are located between the passageway 70 structural support frame 72 and glass (not shown) to be replaced. Then, the glass to be replaced is removed. Any weather stripping is then taken off of the removed exterior stops and from the interior stops 90 that remain surrounding the passageway frame 72. To reinforce the existing passageway frame 72 and the exterior and interior stops 94, 90, the interior stops 90 are first drilled and the above described interior metal screws 96 are counter sunk into the interior stops 90 and the metal screws pass through the interior stops 90 and into the top surface 98 of the passageway frame at least 13 mm [about 0.5 inches]. The interior screws 96 are positioned every 304 mm [12 inches] along the interior stop 90 on-center starting at a center of each interior stop 90. A minimum of three screws are required for each stop 90 unless the stop is less than 304 mm [12 inches] in length.

The metal screws 96 are flat headed screws, and are not smaller than a size 8 screw. (For purposes herein, a "size 8 screw" is to mean that a diameter of the threaded shaft of the screw is about 4.1656 mm [0.1640 inches].) After the interior stops 90 are thereby reinforced, the removed exterior stops 94 are reinserted into the frame 72 of the passageway 70, and then reinforced in the same manner as the interior stops 96 as described above, through insertion of the exterior metal screws 100. The reinforcing screws 100 of the exterior stops 94 are positioned so that the screws 100 in the exterior stops 94 are aligned with the screws 96 in the interior stops 90.

After reinforcing the stops 90, 94, the exterior stops 94 are removed, and then an interior bead 104A of about 3.048 mm

[0.120 (⅛) inch] diameter of the blast proof caulking 104A is applied at a base of the interior stop 90 and the top surface 98 of the door frame compression receiver 92 so that the bead 104A surrounds an entire perimeter of the passageway frame 72. Then, the method includes installing one of the thin panel, embodiment 10 and the thick panel embodiment 60 of the shatter-resistant, optically-transparent panel 10, 60 into the passageway frame 72 adjacent the bead 104A of caulking.

Next, another or exterior 3.048 mm [0.120 (⅛) inch] bead 104B of the blast proof caulking is applied along an entire exterior perimeter of the selected panel 10, 60 where the panel 10, 60 meets the top surface 98 of the door frame compression receiver 92. The exterior stops 94 are then installed into the frame 72 so that holes drilled in the stops 94 align with holes drilled in the top surface 98 of the passageway frame 72. Finally, an interior supplemental bead 112 that is less than 3.048 mm [0.120 (⅛) inch] of the blast proof caulking is applied within any gap between the interior surface 50, 50' of the selected panel 10, 60 and the interior stops 90, and an exterior supplemental bead 114 may be applied within any gap between the exterior surface 16, 16' of the selected panel 10, 60 and the exterior stops 94. The door frame 72 is thereby substantially reinforced at the site of its usage, while the shatter-resistant transparent panels 10, 60 have also enormously increased the safety of the door 70. In many instances, the door 70 may be reinforced in the above manner without even removing it from its hinges 74A, 74b, to further reduce the cost of reinforcing the door 70 while replacing non-shatter resistant transparent, panels (not shown).

Production of the thin embodiment 10 and the thick embodiment 60, involve assembly of the embodiments 10, 60 within heated vacuum chambers (not shown) under conditions that are known in the production of prior art multi-layered, intrusion resistant, optically transparent panels (not shown).

While the present disclosure has been presented above with respect to the described and illustrated embodiments of the shatter-resistant, optically-transparent panels 10, 60, 73, 102 and methods of use of the panels for on-site retrofitting and reinforcing of passageways 70, it is to be understood that the disclosure is not to be limited to those alternatives and described embodiments. Accordingly, reference should be made primarily to the following claims rather than the forgoing description to determine the scope of the disclosure.

What is claimed is:

1. A reinforced passageway supporting an optically transparent panel, the passageway including a frame surrounding the transparent panel, the frame including an interior structural surface, an opposed exterior structural surface and a top structural surface secured to and extending between the interior and exterior structural surfaces, the top structural surface also forming a base of a compression receiver, the compression receiver including an interior grab-clip at an outer edge of the interior structural surface and of the base and an exterior grab-clip at an opposed outer edge of the exterior structural surface and of the base, an interior stop being secured adjacent the interior grab-clip and surrounding the frame, an exterior stop being secured adjacent the exterior grab-clip and surrounding the frame, and the transparent panel being secured between the interior and exterior stops, the interior and exterior grab-clips being configured to compress the stops and panel between the grab-clips to thereby resist movement of the stops and panel away from the top structural surface base of the compression receiver, the reinforced passageway comprising:

a. the transparent panel being one of a shatter-resistant five-layer thin panel and a shatter-resistant seven-layer thick panel, each of the panels including opposed exterior glass sheets, first and second urethane sheets between the exterior glass sheets, and a polycarbonate sheet between the urethane sheets, wherein the transparent panel has a weight no greater than about 4.6 pounds per square foot, and wherein the polycarbonate sheet defines an insertion tab extending beyond a common perimeter edge defined by the glass sheets and the urethane sheets overlying each other; and, b. the transparent panel being secured between the interior stop and the exterior stop so that the insertion tab of the polycarbonate sheet contacts the top structural surface base of the frame compression receiver, and so that the common perimeter edge defined by the glass sheets and urethane sheets is positioned above the top structural surface base of the compression receiver to thereby define an interior pivot void between the insertion tab and the interior stop and an exterior pivot void between the insertion tab and the exterior stop.

2. The reinforced passageway of claim 1, further comprising a plurality of metal fasteners passing through the interior stop and the top surface base of the compression receiver adjacent the interior stop, and a plurality of metal fasteners passing through the exterior stop and the top surface base of the compression receiver adjacent the exterior stop.

3. The reinforced passageway of claim 2, wherein each of the plurality of metal fasteners comprises a metal screw having a diameter of a shaft of the screw of at least about 4.1656 millimeters.

4. The reinforced passageway of claim 2, further comprising a first bead of blast proof caulking secured between the interior stop and the shatter-resistant, optically-transparent panel and the first bead surrounding the frame, and a second bead of blast proof caulking secured between the exterior stop and the shatter-resistant, optically-transparent panel and the second bead surrounding the frame.

\* \* \* \* \*